(12) United States Patent
Reimer (10) Patent No.: US 11,804,127 B2
(45) Date of Patent: Oct. 31, 2023

(54) AUTO-CONFIGURING OF BATTERY OPERATED DEVICES IN A PREMISES SECURITY SYSTEM

(71) Applicant: The ADT Security Corporation, Boca Raton, FL (US)

(72) Inventor: Mark Reimer, Denver, CO (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/090,935

(22) Filed: Dec. 29, 2022

(65) Prior Publication Data

US 2023/0142128 A1 May 11, 2023

Related U.S. Application Data

(63) Continuation of application No. 17/404,711, filed on Aug. 17, 2021, now Pat. No. 11,568,735.
(Continued)

(51) Int. Cl.
| | | |
|---|---|---|
| G08B 29/00 | (2006.01) | |
| G08B 29/18 | (2006.01) | |
| G06N 20/00 | (2019.01) | |
| G08B 13/04 | (2006.01) | |
| G08B 13/196 | (2006.01) | |
| G08B 17/10 | (2006.01) | |
| G08B 25/00 | (2006.01) | |

(52) U.S. Cl.
CPC .......... *G08B 29/181* (2013.01); *G06N 20/00* (2019.01); *G08B 13/04* (2013.01); *G08B 13/19682* (2013.01); *G08B 17/10* (2013.01); *G08B 25/008* (2013.01)

(58) Field of Classification Search
CPC ................ G08B 29/181; G08B 13/04; G08B 13/19682; G08B 17/10; G08B 25/008; G08B 25/14; G08B 13/191; G06N 20/00
See application file for complete search history.

(56) References Cited

U.S. PATENT DOCUMENTS 10,706,323 B1 * 7/2020 Liebman ................ G06N 20/00
2005/0275528 A1 12/2005 Kates
(Continued)

FOREIGN PATENT DOCUMENTS

| CN | 110475223 A | 11/2019 | |
|---|---|---|---|
| GB | 2541460 A * | 2/2017 | ............. G01D 21/00 |
| GB | 2541460 A | 2/2017 | |

OTHER PUBLICATIONS

International Search Report and Written Opinion dated Dec. 1, 2021, for International Application No. PCT/JS2021/046316, International Filing Date; Aug. 17, 2021; consisting of 13 pages.

*Primary Examiner* — Ojiako K Nwugo
(74) *Attorney, Agent, or Firm* — Christopher & Weisberg, P.A.

(57) ABSTRACT

A premises control unit in communication with at least one battery operated sensor of a premises security system is provided. The premises control unit includes processing circuitry configured to configure at least one parameter for the at least one battery operated sensor where the configuration of the at least one parameter is based at least on data collected by the premises security system, and the at least one parameter includes at least sleep cycles for the at least one battery operated sensor.

20 Claims, 3 Drawing Sheets

Related U.S. Application Data (60) Provisional application No. 63/066,619, filed on Aug. 17, 2020.

(56) References Cited

U.S. PATENT DOCUMENTS

| | | | | |
|---|---|---|---|---|
| 2007/0139183 A1* | 6/2007 | Kates | .................. | G08B 25/005 |
| | | | | 340/539.22 |
| 2013/0243418 A1* | 9/2013 | Haramaty | .......... | H04Q 11/0067 |
| | | | | 398/5 |
| 2016/0198404 A1* | 7/2016 | Tsiatsis | ................ | H04L 41/084 |
| | | | | 455/507 |
| 2019/0055835 A1* | 2/2019 | Brookes | ................ | E21B 47/047 |
| 2020/0260360 A1* | 8/2020 | Xhafa | ................. | H04W 40/248 |
| 2022/0243521 A1* | 8/2022 | Herman | ................ | E05F 15/622 |

\* cited by examiner

AUTO-CONFIGURING OF BATTERY OPERATED DEVICES IN A PREMISES SECURITY SYSTEM

CROSS REFERENCE TO RELATED APPLICATION

This application is a continuation of and claims priority to U.S. Utility application Ser. No. 17/404,711, filed on Aug. 17, 2021, entitled AUTO-CONFIGURING OF BATTERY OPERATED DEVICES IN A PREMISES SECURITY SYSTEM, which claims priority to U.S. Provisional Patent Application Ser. No. 63/066,619, filed Aug. 17, 2020, the entireties of both which are incorporated herein by reference.

FIELD

This disclosure relates in general to premises security and home automation, and in particular to using auto-configuration to control the sleep cycles of battery operated devices, e.g., passive infrared (PIR) motion detectors.

BACKGROUND

Battery operated passive infrared (PIR) motion detectors use sleep cycles to conserve battery life and to prevent multiple alarm signals from being transmitted for the same occurrence of motion. For many PIR motion detectors, the duration of the sleep mode is set at the time of manufacture. Some PIR motion detectors will allow the installer to configure the sleep mode by toggling a switch (or multiple switches) on the device to choose between multiple sleep modes. These configurable sleep modes can range from a few minutes to a few seconds in duration. Once the switch(es) has been set, the PIR sleep mode cannot be re-configured without removing the PIR motion detector and toggling the switch(es) again.

For example, consider a premises, such as a small business, that has constant activity near the front entrance with a nearby PIR motion detector. Upon detecting motion, the PIR motion detector will send a detection signal to the security alarm panel and then the PIR motion detector will enter a sleep mode, for some period of time, e.g., 2-4 minutes. Following exit of the sleep mode, the PIR motion detector will immediately send another detection signal and then go back into sleep mode. This may continue until the small business closes and motion ceases. Each of the motion detection signal transmissions consumes battery, this shortening battery life. However, since the small business is open for business during the signal detections, all of the signals are ignored since the alarm was not set to an armed and/or away mode. Over time, this normal pattern of unused detection signal production reduces battery life.

The static nature of the sleep cycle setting for PIR requires the installer to choose between higher security at the expense of reduced battery life, or lower security with increased battery life.

SUMMARY

Some embodiments advantageously provide arrangements for auto-configuring a battery operated sensor such as a PIR sensor, such as a PIR motion detector, to adjusts the sleep configuration of the battery operated sensor using a machine learning algorithm. The system may include a battery operated sensor such as a PIR sensor, e.g., PIR motion detector, with a controllable sleep duration that can be set via electronic communication from the premises security alarm panel.

For ease of understanding, one or more embodiments of the present invention are discussed with respect to PIR motion detectors, but it is understood that the concepts herein can be applied to other types of devices (e.g., battery operated sensors) where a configurable sleep cycle is desired, including those that might be part of a premises security system such as door/window sensors that sense opening and closing actions.

In some embodiments, a security controller server creates a configuration for the PIR motion detectors in the premises that maximizes both security and battery life as compared with other solutions. The security controller server transmits the configuration to a security alarm premises control unit which in turn transmits the configuration to each PIR motion detector. It is also contemplated that the security controller server can directly configure the PIR motion detectors without the need to do so via the intermediary security premises control unit. A machine learning algorithm, such as deep reinforcement learning, learns from the environment, interprets the best configuration, and updates the configuration to maximize security performance and minimize battery use as compared with other solutions. In some embodiments, the optimal configuration for each premises may be provided to the premises control unit.

The inputs for the machine learning algorithm may include one or more of the following data points, as well as other data points:

Motion detection signal timestamps for each PIR motion detector connected to the security alarm panel;
Security alarm panel arm states;
Door open/close sensor signals and/or timestamps;
Window open/close sensor signals and/or timestamps;
Glass break and/or acoustic detector signals and/or timestamps;
Smoke/CO detector signals and/or timestamps;
Video Camera motion and/or person detection signals and/or timestamps;
Battery levels for sensors and/or detectors;
User analytics from security alarm user interfaces such as mobile app, touchscreen, web applications, etc.;
User GPS information;
Security system modes, such as vacation mode, night mode, etc.;
Open/close schedules for business security systems; and
Home automation routines, schedules, scenes, etc.

According to one aspect of the invention, a premises control unit in communication with at least one battery operated sensor of a premises security system is provided. The premises control unit includes processing circuitry configured to: configure at least one parameter for the at least one battery operated sensor where the configuration of the at least one parameter is based at least on data collected by the premises security system, and the at least one parameter includes at least sleep cycles for the at least one battery operated sensor.

According to one or more embodiments of this aspect, the configured at least one parameter includes a sensitivity of the at least one battery operated sensor. According to one or more embodiments of this aspect, the configured sensitivity of the at least one battery operated sensor is based at least on whether the at least one battery operated sensor is one of a life style device and life safety device. According to one or more embodiments of this aspect, the sensitivity is configured to: a first sensitivity if the at least one battery operated sensor is a life style device, and a second sensitivity if the at least one battery operated sensor is a life safety device where the first sensitivity is greater than the second sensitivity.

According to one or more embodiments of this aspect, the data collected by the premises security system includes at least one of: a motion detection signal timestamp for each battery operated sensor; a security alarm panel arm state; at least one of a door sensor signal and timestamp; at least one of a window sensor signal and timestamp; at least one of a glass break signal and acoustic detector signal; a smoke detector signal; a video camera motion detection signal; a battery level for the at least one battery operated sensors; user analytics from a security alarm user interface; user global positioning system (GPS) information; a security system mode; an open schedule for a business associated with the premises security system; and a home automation schedule. According to one or more embodiments of this aspect, the processing circuitry is further configured to analyze the data collected by the premises security system using a machine learning algorithm to determine the configuration of the at least one parameter for the at least one battery operated sensor. According to one or more embodiments of this aspect, the configuration of the at least one parameter for the at least one battery operated sensor is received from a server and is based at least on applying a machine learning algorithm to the data collected by the premises security system.

According to one or more embodiments of this aspect, the machine learning algorithm uses at least a functionality requirement of the at least one battery operated sensor to determine the configuration of the at least one parameter for the at least one battery operated sensor. According to one or more embodiments of this aspect, the at least one battery operated sensor includes at least one PIR motion detector. According to one or more embodiments of this aspect, the at least one battery operated sensor includes a contact sensor.

According to another aspect of the disclosure, a method implemented by a premises control unit that is in communication with at least one battery operated sensor of a premises security system is provided. At least one parameter for the at least one battery operated sensor is configured. The configuration of the at least one parameter is based at least on data collected by the premises security system where the at least one parameter includes at least sleep cycles for the at least one battery operated sensor. According to one or more embodiments of this aspect, the configured at least one parameter includes a sensitivity of the at least one battery operated sensor. According to one or more embodiments of this aspect, the configured sensitivity of the at least one battery operated sensor is based at least on whether the at least one battery operated sensor is one of a life style device and life safety device.

According to one or more embodiments of this aspect, the sensitivity is configured to: a first sensitivity if the at least one battery operated sensor is a life style device, and a second sensitivity if the at least one battery operated sensor is a life safety device where the first sensitivity is greater than the second sensitivity. According to one or more embodiments of this aspect, the data collected by the premises security system includes at least one of: a motion detection signal timestamp for each battery operated sensor; a security alarm panel arm state; at least one of a door sensor signal and timestamp; at least one of a window sensor signal and timestamp; at least one of a glass break signal and acoustic detector signal; a smoke detector signal; a video camera motion detection signal; a battery level for the at least one battery operated sensors; user analytics from a security alarm user interface; user global positioning system (GPS) information; a security system mode; an open schedule for a business associated with the premises security system; and a home automation schedule. According to one or more embodiments of this aspect, the data collected by the premises security system is analyzed using a machine learning algorithm to determine the configuration of the at least one parameter for the at least one battery operated sensor.

According to one or more embodiments of this aspect, the configuration of the at least one parameter for the at least one battery operated sensor is received from a server and is based at least on applying a machine learning algorithm to the data collected by the premises security system. According to one or more embodiments of this aspect, the machine learning algorithm uses at least a functionality requirement of the at least one battery operated sensor to determine the configuration of the at least one parameter for the at least one battery operated sensor. According to one or more embodiments of this aspect, the at least one battery operated sensor includes at least one PIR motion detector. According to one or more embodiments of this aspect, the at least one battery operated sensor includes a contact sensor.

According to another aspect of the disclose, a system is provided. The system includes a passive infrared (PIR) motion detector where the PIR motion detector is battery operated. The system further includes premises control unit that includes processing circuitry that is configured to: implement a machine learning algorithm to analyze premises security system data to determine a first sleep duration cycle configuration and first sensitivity configuration for the PIR motion detector, and configure the PIR motion detector from a second sleep duration cycle configuration and second sensitivity configuration to the first sleep duration cycle configuration and first sensitivity configuration. The first sleep duration cycle configuration is configured to reduce battery consumption of the PIR motion detector compared to the second sleep duration cycle, and the first sensitivity configuration has a lower sensitivity than the second sensitivity configuration.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail example embodiments, it is noted that the embodiments reside primarily in combinations of apparatus components and processing steps related to controlling at least one parameter of at least one battery operated sensor such as a sleep cycle of a PIR motion detector (or other sensor). Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
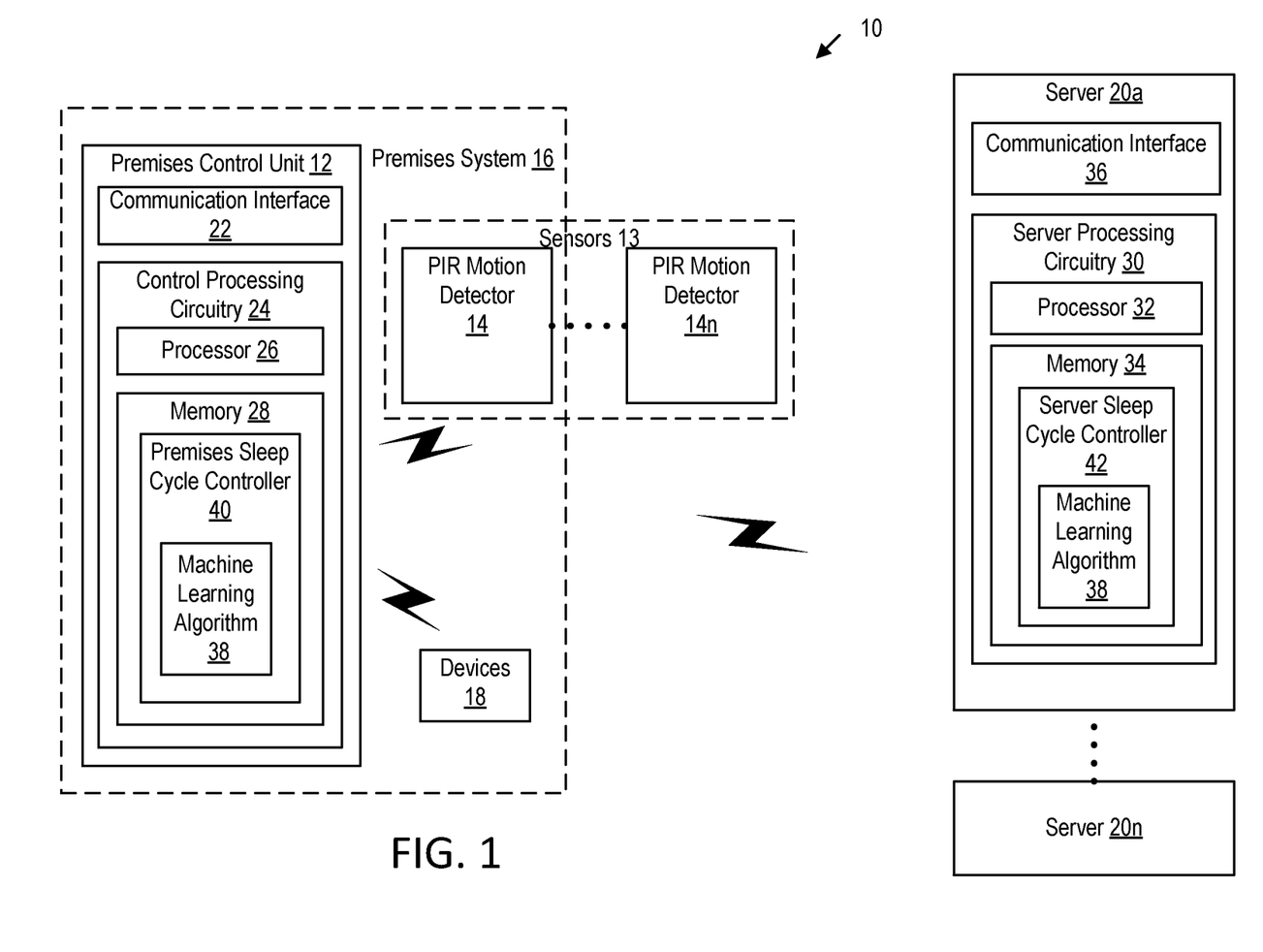
FIG. 1 is a diagram of a system according to some embodiments of the present invention.

Referring now to drawing figures in which like reference designators refer to like elements there is shown in FIG. 1 an example system for controlling the sleep cycle of a PIR motion detector or sensor using a premises system in accordance with the principles of the disclosure and designated generally as "10." System 10 includes premises control unit 12 and one or more sensors 13 such as PIR motion detectors 14a-14n (collectively referred to as PIR motion detectors 14) located in and/or proximate premises 16, in communication with each other via one or more communication protocols, links and/or channels. Although the disclosure herein relates to PIR motion detectors 14 such as may be used as a life safety sensor in premises security systems, in some embodiments, sensors 13 and/or PIR motion detectors 14 may be various other life safety related sensors such as fire sensors, carbon monoxide sensors, flooding sensors and contact sensors, among other sensor types that are known in the art. The premises system 16 (also referred to as premises security system 16) may include, for example, one or more life style related devices 18 having sensors configured to adjust at least one premises setting such as lighting, temperature, energy usage, door lock and power settings, among other settings associated with the premises or devices on the premises. Devices 18 may include digital cameras and/or video cameras, among other image capture devices that are well known in the art. Devices 18 may include mobile devices, wireless devices, computers, laptops and other devices capable of performing device 18 functions described herein. Premises control unit 12, sensors 13, PIR motion detectors 14 and devices 18 are referred to herein collectively as the premises system 16 (i.e., premises security system 16).

System 10 further includes one or more servers 20a-20n in communication with each other via one or more communication protocols, links and/or channels. Premises control unit 12 includes communication interface 22 for communicating with at least one or more of sensors 13, PIR motion detectors 14, devices 18 and servers 20. In one or more embodiments, communication interface 22 includes or is replaced by transmitter circuitry and receiver circuitry for transmitting and receiving signals and/or data. Communication interface 22 can include wired or wireless interfaces and hardware for facilitating communications with other elements such as sensors 13, PIR motion detectors 14, devices 18, servers 20, etc. Communication interface 22 may be configured to support broadband and cellular communications. More broadly, the communication interface 22 may enable remote and local control of premises control unit 12 as well as communication with sensors 13, PIR motion detectors 14, devices 18, servers 20, etc. In some embodiments, communication interface 22 may wirelessly communicate with one or more devices an existing local area network (such as via a home Wi-Fi router) and/or via Bluetooth, ZigBee, or Z-wave.

Premises control unit 12 includes control processing circuitry 24. In some embodiments, control processing circuitry 24 (also referred to as processing circuitry 24) may include a processor 26 and memory 28, memory 28 containing instructions which, when executed by processor 26, configure processor 26 to perform the one or more functions described herein such as the process described with respect to FIG. 2. In addition to a traditional processor and memory, control processing circuitry 24 may comprise integrated circuitry for processing and/or control, e.g., one or more processors and/or processor cores and/or FPGAs (Field Programmable Gate Array) and/or ASICs (Application Specific Integrated Circuitry).

Control processing circuitry 24 may comprise and/or be connected to and/or be configured for accessing (e.g., writing to and/or reading from) memory 28, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by control circuitry and/or other data, e.g., data pertaining to communication, alarm conditions, etc. Control processing circuitry 24 may be configured to control any of the methods described herein and/or to cause such methods to be performed, e.g., by processor 26.

Corresponding instructions may be stored in memory 28, which may be readable and/or readably connected to the control processing circuitry 24. In other words, control processing circuitry 24 may include a controller, which may comprise a microprocessor and/or microcontroller and/or FPGA (Field-Programmable Gate Array) device and/or ASIC (Application Specific Integrated Circuit) device. It may be considered that control processing circuitry 24 includes or may be connected or connectable to memory, which may be configured to be accessible for reading and/or writing by the controller and/or control processing circuitry 24. Memory 28 may be configured to include premises sleep cycle controller 40 code and machine learning algorithm 38 for performing parameter(s) control process such as the sleep cycle control process described in detail with respect to FIG. 2.

In one or more embodiments, servers 20a-20n provide at least one of monitoring of premises control unit 12, sensors 13, PIR motion detectors 14 and/or devices 18, storage (database functions) of account information associated with premises control unit 12, storage of data (database functions) associated with premises control unit 12, and other functions associated with monitoring and/or configuration of premises control unit 12, sensors 13, PIR motion detectors 14 and/or devices 18. Server 20 includes communication interface 36 for wired or wirelesses communicating with at least one of one or more sensors 13 and/or PIR motion detectors 14 and/or devices 18, premises control unit 12 and any other devices that may be in system 10. In one or more embodiments, communication interface 36 includes or is replaced by transmitter circuitry and receiver circuitry for transmitting and receiving signals and/or data.

Server 20 includes server processing circuitry 30. In some embodiments, the server processing circuitry 30 may include a processor 32 and memory 34. Memory 34 contains instructions which, when executed by processor 32, configure processor 32 to perform the one or more functions described herein such as the process described with respect to FIG. 2. In addition to a traditional processor and memory, server processing circuitry 30 may comprise integrated circuitry for processing and/or control, e.g., one or more processors and/or processor cores and/or FPGAs (Field Programmable Gate Array) and/or ASICs (Application Specific Integrated Circuitry).

Server processing circuitry 30 may comprise and/or be connected to and/or be configured for accessing (e.g., writing to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry, data, premises system 16 account information, premises control unit 12 data and/or configuration, billing information, etc. Server processing circuitry 30 may be configured to control any of the methods described herein and/or to cause such methods to be performed, e.g., by processor 32. Corresponding instructions may be stored in the memory 34, which may be readable and/or readably connected to server processing circuitry 30. In other words, server processing circuitry 30 may include a controller, which may comprise a microprocessor and/or microcontroller and/or FPGA (Field-Programmable Gate Array) device and/or ASIC (Application Specific Integrated Circuit) device. It may be considered that server processing circuitry 30 includes or may be connected or connectable to memory, which may be configured to be accessible for reading and/or writing by the controller and/or server processing circuitry 30. Memory 34 is configured to store server sleep cycle controller 42 code for performing the sleep cycle control process described in detail with respect to FIG. 2. Server sleep cycle controller 42 in memory 34 may include machine learning algorithm 38 that is used to facilitate the parameter control process such as the sleep cycle control process described herein.

In one or more embodiments, the premises control unit 12 may be a security system controller that uses machine learning algorithm 38 and premises sleep cycle controller 40 and/or server sleep cycle controller 42 to control the sleep cycles of the one or more PIR motion detectors 14 to minimize the power consumption of the PIR motion detectors 14 while providing a desired level of security monitoring of the customer premises. In particular, premises sleep cycle controller 40 may be configured to control one or more configurable parameters of one or more sensors 13 and/or devices 18.

The communication link between the premises system 16 and server 20 may be any type of suitable wireless or wired communication link.

In one or more embodiments, the premises control unit 12 may be a home automation system or a security system that includes home automation functionality, and the devices 18 may be lighting equipment, heating and cooling equipment, kitchen appliances, etc. that are controlled by the premises control unit 12. in accordance with some embodiments of the present invention. In some embodiments, the home automation system may be system 10 of FIG. 1. The home automation system 10 includes one or more PIR motion detectors 14 or sensors 13 in communication with a home automation panel that is part of premises control unit 12. The home automation panel may be in communication with a home automation controller in the server based system 20. The home automation controller uses machine learning algorithm 38 and premises sleep cycle controller 40 and/or server sleep cycle controller 42 to control at least one parameter (i.e., configurable parameter) of one or more battery operated sensors such as the sleep cycles of the one or more PIR motion detectors 14 to minimize the power consumption of the PIR motion detectors 14 while providing a desired level of monitoring of the customer premises. In addition, the home automation controller controls premises devices 18 such as premises equipment, lighting, etc. at the customer premises.

By way of non-limiting example, machine learning algorithm 38 can be configured to learn when "normal", i.e., typical, expected, occurs. For example, "normal" behavior may be learned to occur Monday-Friday when all home residents leave the premises by 9:00 am, the premises control unit 12 is in the armed-away state, the lights are turned off, the garage door is closed, and the door locks are in the locked position. There is no motion in the premises. In this case, the ideal state of the sleep cycle for all internal PIR motion detectors 14 may be a short sleep cycle, e.g., 2 seconds, and these PIR motion detectors 14 may be configured with a 2 second sleep cycle after 9 am such as via, for example, premises sleep cycle controller 40 and/or server sleep cycle controller 42. This will allow sufficient data to be collected in an alarm event to be able to identify where the person went through digital 'breadcrumbs' PIR motion events. This may be valuable information to first responders and to the premises owner. In summary, premises control unit 12 and/or server 20 may be configured to learn, via machine learning algorithm 38, that an unoccupied premises+premises control unit 12 being set to a system armed away state+doors being locked=short sleep cycle settings (as compared with other sleep cycle settings) for PIR motion detectors 14. Doors can be detected as being locked by door lock sensors on devices 18. Machine learning algorithm 38 may also learn normal from abnormal behavior and adjust the sleep cycles to be low during abnormal behavior events. Machine learning algorithm 38 will learn when to adjust the sleep cycles as to not overload PIR motion detectors 14 with too frequent configuration changes which may negatively affect battery life.

Some embodiments may include additional useful features. For example, a home automation use case is automatic lighting control which reacts intelligently as a person walks from room to room, by turning on lights in the rooms that are currently occupied and turning off lights in rooms that are unoccupied. Embodiments may also be used to control lighting to maximize energy efficiency. Since traditional PIR motion detectors are too slow to react, due to the static nature of the sleep mode, they are not ideal for turning on and off lights depending on whether the room is occupied or not. In accordance with some embodiments, the PIR sleep duration and PIR sensitivity can be optimized for connected lighting use cases, allowing the PIR motion detector to be used for both life safety and home automation purposes.

Although FIG. 1 shows various "units" such as premises sleep cycle controller 40 and/or server sleep cycle controller 42 being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 2:
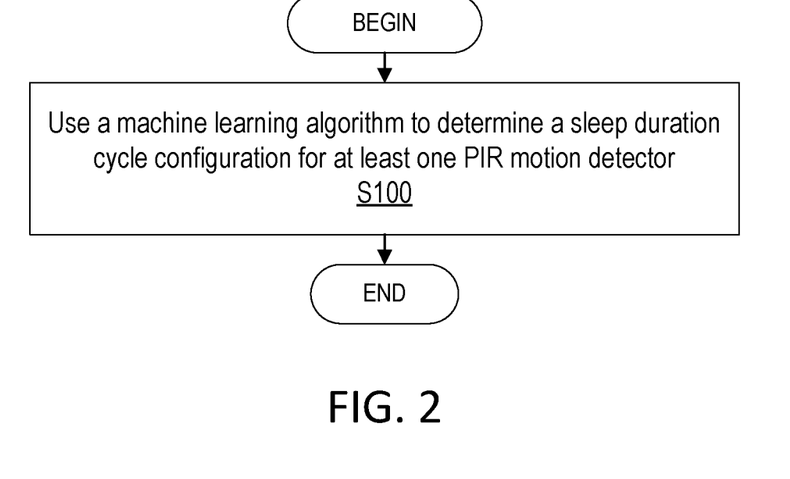
FIG. 2 is a flowchart of an example process in a system for controlling a sleep duration cycle of at least one PIR motion detector according to some embodiments of the present invention.

FIG. 2 is a flowchart of an example process in a system for using a machine learning algorithm 38 to determine at least one parameter (e.g., sleep duration cycle configuration) for at least one battery operated sensor (e.g., PIR motion detector). One or more Blocks and/or functions performed by the system may be performed by one or more elements of system 10 such as by sensor 13, PIR motion detector 14, premises control unit 12, control processing circuitry 24, premises sleep cycle controller 40, machine learning algorithm 38, in premises system 16 and/or server processing circuitry 30, machine learning algorithm 38 and server sleep cycle controller 42 in server 20. In one or more embodiments, system 10 such as by sensor 13, PIR motion detector 14, premises control unit 12, control processing circuitry 24, premises sleep cycle controller 40, machine learning algorithm 38, in premises system 16 and/or server processing circuitry 30, machine learning algorithm 38 and server sleep cycle controller 42 in server 20 is configured to use (Block S100) a machine learning algorithm 38 to determine a sleep duration cycle configuration for at least one sensor (i.e., battery operated), such as a PIR motion detector 14.

In one or more embodiments, system 10 such as by PIR motion detector 14, premises control unit 12, control processing circuitry 24, premises sleep cycle controller 40, machine learning algorithm 38, in premises system 16 and/or server processing circuitry 30, machine learning algorithm 38 and server sleep cycle controller 42 in server 20 is configured to use a machine learning algorithm 38 to determine a sleep duration cycle configuration for the at least one PIR motion detector 14 based on a lighting requirement.

In one or more embodiments, machine learning algorithm 38 may use at least one of the following as an input: a motion detection signal timestamp for each PIR motion detector 14 connected to a security alarm panel; a security alarm panel arm state; a door open/close sensor signal and/or timestamp; a window open/close sensor signal and/or timestamp; a glass break and/or acoustic detector signal and/or timestamp; a smoke/CO detector signal and/or timestamp; a video camera motion and/or person detection signal and/or timestamp; a battery level for a sensor and/or detector; user analytics from a security alarm user interface comprising at least one of a mobile app, touchscreen or web applications; user GPS information; a security system mode; an open/close schedule for a business security system and a home automation routine, schedule, and/or scene. It is contemplated that different weights can be applied to the different input values to adjust/tune/program the algorithm.

Figure 3:
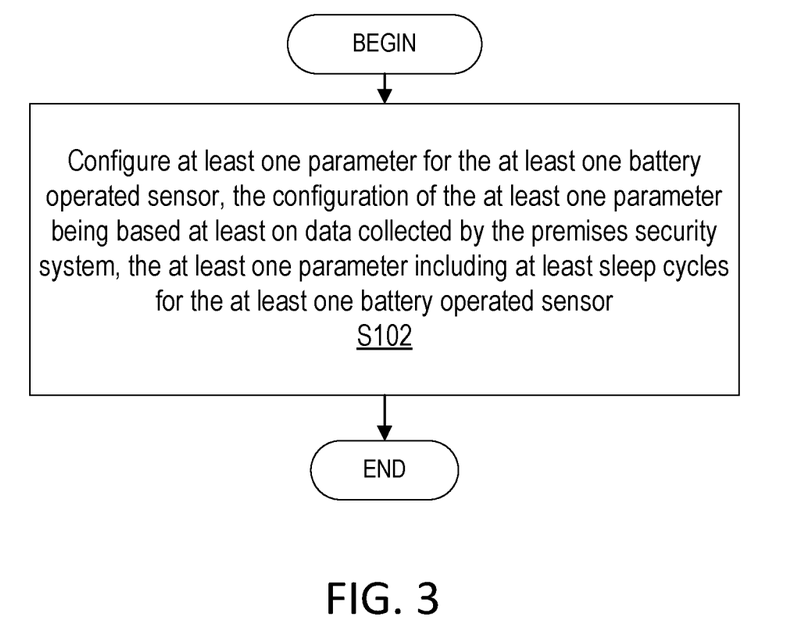
FIG. 3 is a flowchart of an example process implemented by a premises control unit according to some embodiment of the present invention.

FIG. 3 is a flowchart of an example process implemented by a premises control unit 12 according to one or more embodiments of the present invention. One or more Blocks and/or functions of FIG. 3 may be performed by premises control unit 12 such as via one or more of control processing circuitry 24, processor 26, premises sleep cycle controller 40, machine learning algorithm 38, etc. Premises control unit 12 is configured to configure (Block S102) at least one parameter for the at least one battery operated sensor 13, the configuration of the at least one parameter being based at least on data collected by the premises security system 16 where the at least one parameter includes at least sleep cycles for the at least one battery operated sensor 13, as described herein. According to one or more embodiments, the configured at least one parameter includes a sensitivity of the at least one battery operated sensor 13. According to one or more embodiments, the configured sensitivity of the at least one battery operated sensor 13 is based at least on whether the at least one battery operated sensor 13 is one of a life style device and life safety device. According to one or more embodiments, the sensitivity is configured to: a first sensitivity if the at least one battery operated sensor 13 is a life style device, and a second sensitivity if the at least one battery operated sensor 13 is a life safety device, the first sensitivity being greater than the second sensitivity.

According to one or more embodiments, the data collected by the premises security system 16 includes at least one of: a motion detection signal timestamp for each battery operated sensor 13; a security alarm panel arm state; at least one of a door sensor signal and timestamp; at least one of a window sensor signal and timestamp; at least one of a glass break signal and acoustic detector signal; a smoke detector signal; a video camera motion detection signal; a battery level for the at least one battery operated sensors; user analytics from a security alarm user interface; user global positioning system (GPS) information; a security system mode; an open schedule for a business associated with the premises security system; and a home automation schedule. According to one or more embodiments, the processing circuitry 24 is further configured to analyze the data collected by the premises security system using a machine learning algorithm 38 to determine the configuration of the at least one parameter for the at least one battery operated sensor.

According to one or more embodiments, the configuration of the at least one parameter for the at least one battery operated sensor 13 is received from a server 20 and is based at least on applying a machine learning algorithm 38 to the data collected by the premises security system 16. According to one or more embodiments, the machine learning algorithm 38 uses at least a functionality requirement of the at least one battery operated sensor 13 to determine the configuration of the at least one parameter for the at least one battery operated sensor 13. According to one or more embodiments, the at least one battery operated sensor 13 includes at least one PIR motion detector 14. According to one or more embodiments, the at least one battery operated sensor 13 includes a contact sensor.

Figure 4:
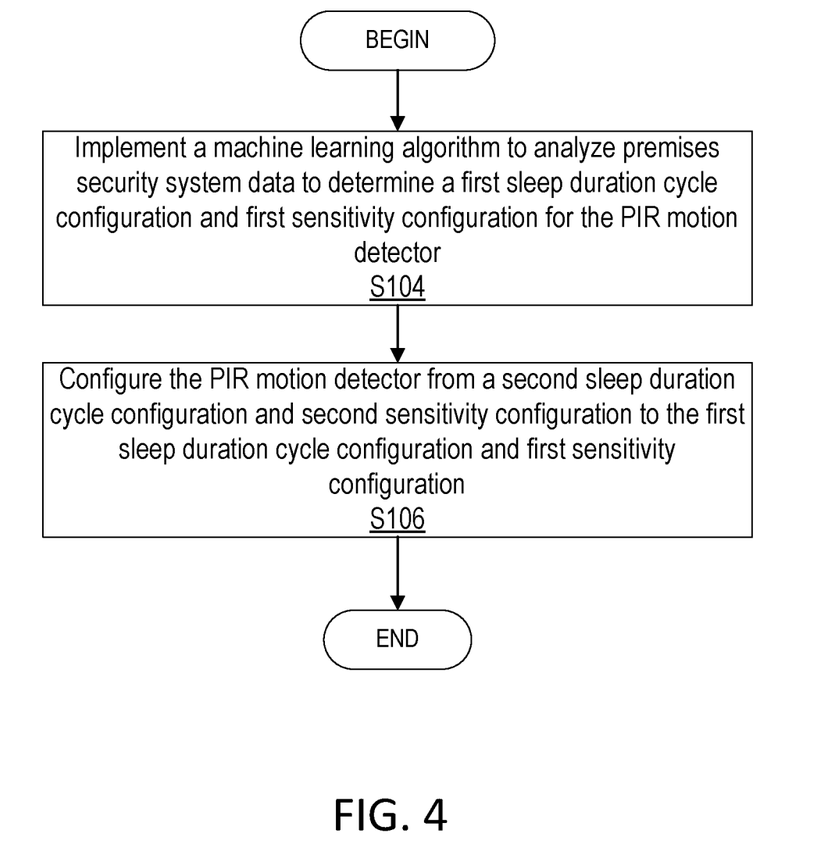
FIG. 4 is a flowchart of another example process implemented by a premises control unit according to some embodiment of the present invention.

FIG. 4 is a flowchart of another example process implemented by a premises control unit 12 according to one or more embodiments of the present invention. In particular, the premises control unit 12 is part of premises system 16 that includes at least one PIR motion detector 14. One or more Blocks and/or functions of FIG. 4 may be performed by premises control unit 12 such as via one or more of control processing circuitry 24, processor 26, premises sleep cycle controller 40, machine learning algorithm 38, etc. Premises control unit 12 is configured to implement (Block S104) a machine learning algorithm 38 to analyze premises security system data to determine a first sleep duration cycle configuration and first sensitivity configuration for the PIR motion detector 14, as described herein. Premises control unit 12 is configured to configure (Block S106) the PIR motion detector 14 from a second sleep duration cycle configuration and second sensitivity configuration to the first sleep duration cycle configuration and first sensitivity configuration, as described herein. The first sleep duration cycle configuration is configured to reduce battery consumption of the PIR motion detector 14 compared to the second sleep duration cycle, and the first sensitivity configuration has a lower sensitivity than the second sensitivity configuration.

Using the small business example discussed above, to maximize battery life and motion detection performance, some embodiments disclosed herein may configure the sleep mode cycle period to a high sleep duration value, such as sleeping during the business hours when the security system is not armed. When the security alarm is in an active mode such as "Armed Away", etc., the PIR motion detector 14 may change the sleep mode cycle period to a very short duration, for example 2 seconds, to increase security and provide up-to-date information to the premises control unit 12. This, in combination with other sensor data, will provide the security monitoring provider and first responders more complete information for example on a path a person took through the customer premises and where they may currently be.

EXAMPLES

Example A1. A system 10 comprising:
at least one sensor 13, wherein the sensor may be a PIR motion detector 14; and
a machine learning algorithm 38 that determines a sleep duration cycle configuration for the at least one PIR motion detector 14.

Example A2. The system 10 of Example A1, wherein the machine learning algorithm 38 determines a sleep duration cycle configuration for the at least one PIR motion detector 14 based on a lighting requirement.

Example A3. The system 10 of any one of Examples A1 and A2, wherein the machine learning algorithm 38 uses at least one of the following as an input:
  a motion detection signal timestamp for each PIR motion detector 14 connected to the security alarm panel;
  a security alarm panel arm state;
  a door open/close sensor signal and/or timestamp;
  a window open/close sensor signal and/or timestamp;
  a glass break and/or acoustic detector signal and/or timestamp;
  a smoke/CO detector signal and/or timestamp;
  a video camera motion and/or person detection signal and/or timestamp;
  a battery level for a sensors and/or detector;
  user analytics from a security alarm user interface comprising at least one of a mobile app, touchscreen or web applications;
  user GPS information;
  a security system mode;
  an open/close schedule for a business security system; and
  a home automation routine, schedule, and or scene.

Example A4. The system 10 of any one of Examples A1-A3, further comprising a premises control unit 12, the premises control unit 12 configured to provide life safety functions, wherein the machine learning algorithm is comprised in the premises control unit.

Example A5. The system 10 of any one of Examples A1-A3, further comprising a server 20 at a location remote from the PIR motion detector 14, wherein the machine learning algorithm is comprised in the server 20, and wherein the sleep cycle of the PIR motion detector 14 is determined by the server 20.

Example B1. A method for controlling a sleep cycle of a sensor such as a PIR motion detector 14, the method comprising:
using a machine learning algorithm 38 to determine a sleep duration cycle configuration for at least one PIR motion detector 14.

Example B2. The method of Example B1 further comprising using a machine learning algorithm 38 to determine a sleep duration cycle configuration for the at least one PIR motion detector 14 based on a lighting requirement.

Example B3. The method of any one of Examples B1 and B2 wherein the machine learning algorithm 38 uses at least one of the following as an input:
  a motion detection signal timestamp for each PIR motion detector 14 connected to the security alarm panel;
  a security alarm panel arm state;
  a door open/close sensor signal and/or timestamp;
  a window open/close sensor signal and/or timestamp;
  a glass break and/or acoustic detector signal and/or timestamp;
  a smoke/CO detector signal and/or timestamp;
  a video camera motion and/or person detection signal and/or timestamp;
  a battery level for a sensors and/or detector;
  user analytics from a security alarm user interface comprising at least one of a mobile app, touchscreen or web applications;
  user GPS information;
  a security system mode;
  an open/close schedule for a business security system; and
  a home automation routine, schedule, and or scene.

Example B4. The method of any one of Examples B1-B3, further comprising configuring the at least one PIR motion detector 14 based at least in part on the determined sleep duration cycle configuration.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A premises control unit configured to be in communication with at least one battery operated sensor of a premises security system, the premises control unit comprising:
processing circuitry configured to:
determine at least one parameter based at least on timestamp data collected by the premises security system, the at least one parameter comprising at least sleep cycles for the at least one battery operated sensor; and
configure the at least one parameter for the at least one battery operated sensor.

2. The premises control unit of claim 1, wherein the at least one parameter comprises a sensitivity of the at least one battery operated sensor.

3. The premises control unit of claim 2, wherein the sensitivity of the at least one battery operated sensor is based at least on whether the at least one battery operated sensor is one of a lifestyle device or a life safety device.

4. The premises control unit of claim 3, wherein the sensitivity is configured to:
a first sensitivity if the at least one battery operated sensor is a life style device; and
a second sensitivity if the at least one battery operated sensor is a life safety device, the first sensitivity being greater than the second sensitivity.

5. The premises control unit of claim 1, wherein the timestamp data collected by the premises security system comprises at least one of:
a motion detection signal timestamp for each battery operated sensor;
a door sensor timestamp;
a window sensor timestamp;
a glass break timestamp;
an acoustic detector timestamp;
a smoke detector timestamp; and
a video camera motion detection timestamp.

6. The premises control unit of claim 1, wherein the processing circuitry is further configured to analyze the timestamp data collected by the premises security system using a machine learning algorithm to determine the configuration of the at least one parameter for the at least one battery operated sensor.

7. The premises control unit of claim 1, wherein the configuration of the at least one parameter for the at least one battery operated sensor is received from a server and is based at least on applying a machine learning algorithm to the timestamp data collected by the premises security system.

8. The premises control unit of claim 6, wherein the machine learning algorithm uses at least a functionality requirement of the at least one battery operated sensor to determine the configuration of the at least one parameter for the at least one battery operated sensor.

9. The premises control unit of claim 1, wherein the at least one battery operated sensor comprises at least one passive infrared (PIR) motion detector.

10. The premises control unit of claim 1, wherein the at least one battery operated sensor comprises a contact sensor.

11. A method implemented by a premises control unit that is in communication with at least one battery operated sensor of a premises security system, the method comprising:
determining at least one parameter based at least on timestamp data collected by the premises security system, the at least one parameter comprising at least sleep cycles for the at least one battery operated sensor; and
configuring the at least one parameter for the at least one battery operated sensor.

12. The method of claim 11, wherein the configured at least one parameter comprises a sensitivity of the at least one battery operated sensor.

13. The method of claim 12, wherein the configured sensitivity of the at least one battery operated sensor is based at least on whether the at least one battery operated sensor is one of a life style device and life safety device.

14. The method of claim 13, wherein the sensitivity is configured to:
a first sensitivity if the at least one battery operated sensor is a life style device; and
a second sensitivity if the at least one battery operated sensor is a life safety device, the first sensitivity being greater than the second sensitivity.

15. The method of claim 11, wherein the timestamp data collected by the premises security system comprises at least one of:
a motion detection signal timestamp for each battery operated sensor;
a door sensor timestamp;
a window sensor timestamp;
a glass break timestamp;
an acoustic detector timestamp;
a smoke detector timestamp; and
a video camera motion detection timestamp.

16. The method of claim 11, further comprising analyzing the timestamp data collected by the premises security system using a machine learning algorithm to determine the configuration of the at least one parameter for the at least one battery operated sensor.

17. The method of claim 11, wherein the configuration of the at least one parameter for the at least one battery operated sensor is received from a server and is based at least on applying a machine learning algorithm to the timestamp data collected by the premises security system.

18. The method of claim 16, wherein the machine learning algorithm uses at least a functionality requirement of the at least one battery operated sensor to determine the configuration of the at least one parameter for the at least one battery operated sensor.

19. The method of claim 11, wherein the at least one battery operated sensor comprises at least one of a PIR motion detector or contact sensor.

20. A system comprising:
a passive infrared (PIR) motion detector, the PIR motion detector being battery operated; and
premises control unit comprising processing circuitry that is configured to:
implement a machine learning algorithm to analyze premises security system data to determine a first sleep duration cycle configuration and first sensitivity configuration for the PIR motion detector;
configure the PIR motion detector from a second sleep duration cycle configuration and second sensitivity configuration to the first sleep duration cycle configuration and first sensitivity configuration;
the first sleep duration cycle configuration configured to reduce battery consumption of the PIR motion detector compared to the second sleep duration cycle; and
the first sensitivity configuration having a lower sensitivity than the second sensitivity configuration.

* * * * *